April 24, 1934.    W. SMITH    1,956,478
RESTRAINING DEVICE
Filed April 26, 1933
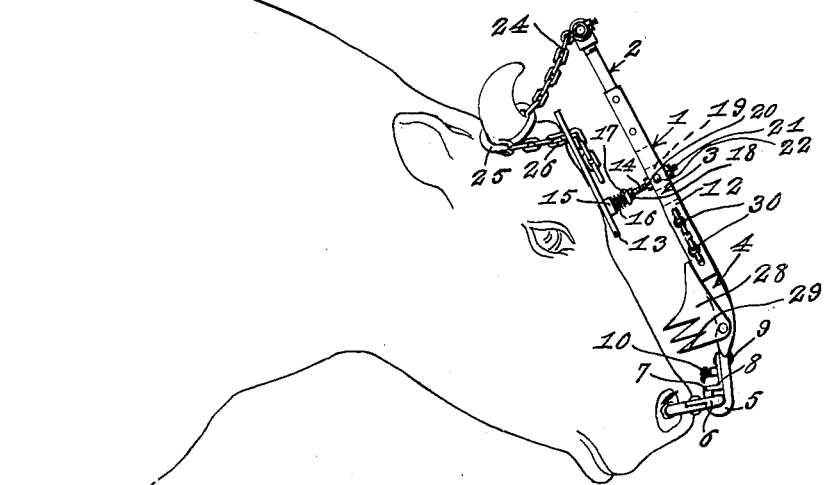
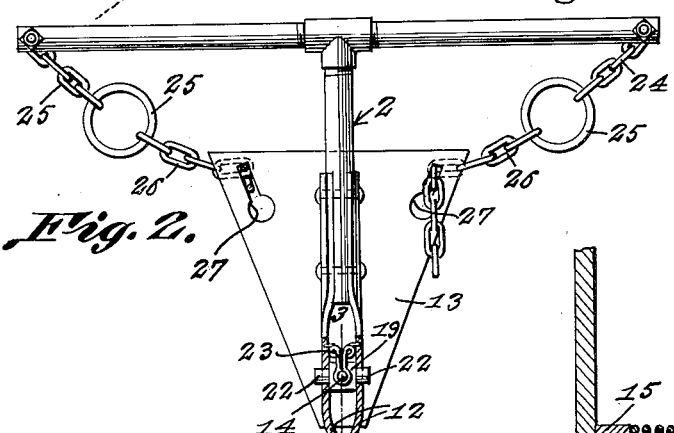
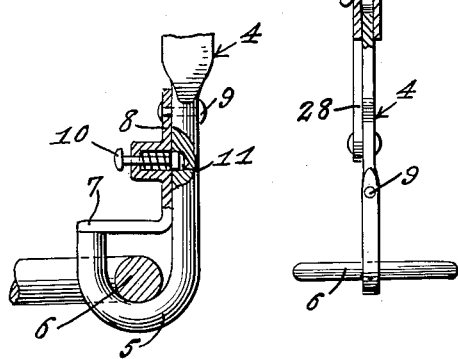
William Smith, INVENTOR
BY Victor J. Evans & Co.
ATTORNEY Patented Apr. 24, 1934

1,956,478

UNITED STATES PATENT OFFICE 1,956,478

RESTRAINING DEVICE

William Smith, Chehalis, Wash.

Application April 26, 1933, Serial No. 668,133

4 Claims. (Cl. 119—142)

This invention relates to restraining devices for cattle and like animals and has for the primary object, the provision of a device which will restrain an animal from butting or otherwise injuring another animal or a person and otherwise provides an efficient medium whereby a dangerous or unruly animal may be easily handled and made to obey the desire of a person attending such animal.

With these and other objects in view this invention consists in certain novel features of construction, combination and arrangement of parts to be hereinafter more fully described and claimed.

In the drawing:

Figure 1 is a fragmentary side elevation of an animal showing a restraining device applied thereto and constructed in accordance with my invention.

Figure 2 is a front elevation partly in section illustrating the restraining device.

Figure 3 is a sectional view taken on the line 3—3 of Figure 2.

Figure 4 is a detail sectional view illustrating the connection of the restraining device with the nose ring of the animal.

Referring in detail to the drawing, the numeral 1 indicates a restraining member which is in its entirety substantially T-shaped, consisting of sections 2, 3 and 4. The section 4 is in the form of a hook 5 engageable with the nose ring 6 and retained thereon by a keeper or latch 7. The latch 7 is in the form of an L-shaped plate 8 having one end pivotally connected to the section 4, as shown at 9, and its other end movable into and out of engagement with the end of the hook 5. The plate 8 carries a spring pressed plunger 10 engageable with a socket 11 formed in the hook 5 to retain the plate in engagement with the end of the hook to prevent the hook from becoming accidentally disengaged from the nose ring but which will permit easy and quick detachment of the hook from the ring when desired.

The section 3 consists of spaced members 12 to which the section 4 is secured and also the section 2. The section 2 is of T shape with the leg portion thereof secured between the members 12 of the section 3, while the head or horizontal portion of the section 2 is disposed transversely of the animal's head and forwardly thereof, as shown in Figure 1.

A substantially triangular shaped plate 13 rests against the head of the animal, as shown in Figure 1, and has pivotally connected thereto a screw threaded stem 14. A spring seat 15 surrounds the pivotal connection between the stem 14 and the plate and also rests upon the plate and has a coil spring 16 mounted thereon. The spring 16 surrounds a portion of the stem and bears against a cup-shaped washer 17 mounted on the stem and held in adjusted positions on said stem by a nut 18 threaded to the stem. The spring permits the stem to have a pivotal movement with respect to the plate when subjected to force. However, the spring will return the stem to a position at right angles to the plate when relieved of the force. A block 19 is mounted on the stem between nuts 20 and 21 threaded on the stem and the block 19 carries pintles 22 journaled in the members 12 of the section 3, whereby the stem may have pivotal movement with respect to the restraining member 1 or the latter may rock upon the stem when the animal engages the restraining member with an object. A tension member 23 is positioned on the stem between the block and the nut 21 and is connected to the members 12 of the section 3. The action of the tension member 23 is to normally retain the restraining member in a position, as shown in Figure 1, with respect to the head of the animal.

Chains or other flexible elements 24 are connected to the horizontal portion of the restraining member 1 and to enlarged rings 25 that fit over the horns of the animal. The rings 25 also have flexible elements or chains 26 connected thereto which are receivable in key-hole slots 27 formed in the plate 13 aiding in retaining the plate in its position upon the head of the animal.

A plate 28 is removably secured to the section 4 of the restraining device and is provided with teeth or tines 29 directed towards the nose of the animal.

In operation, when the animal brings the lower portion of the restraining member 1 into engagement with an object, the member 1 will rock on the stem 14, causing the tines 29 to engage the nose of the animal and thereby restrain the animal from further action. Should the animal bring the upper portion of the restraining member 1 into engagement with an object, said member 1 will rock on the stem 14 and exert a pull upon the nose ring and thereby restrain the animal from further action. The attendant of the animal by taking hold of the restraining element 2 may easily lead and cause the animal to follow out his desires.

The section 4 is adjustably secured to the section 3 by bolts or like fasteners 30 extending through a slot 31 in the section 4. By having this adjustment permits the restraining device to be applied to animals of different sizes.

While I have shown and described the preferred embodiment of my invention, it will be understood that minor changes in construction, combination and arrangement of parts may be made without departing from the spirit and scope of my invention, as claimed.

Having described the invention, I claim:

1. A restraining device comprising a head plate, a restraining member pivotally mounted on the head plate, prongs carried by the restraining member and positioned adjacent the nose of the animal, means detachably connecting the restraining member to the nose ring of the animal, and flexible elements connected to the restraining member and to the horns of the animal and adjustably connected to the plate.

2. A restraining device comprising a head plate, a restraining member pivotally mounted on the plate, spring means for normally retaining the restraining member in a given position with respect to the plate, prongs carried by the restraining member, adjustable and flexible means between the restraining member and the head of the animal, a hook carried by the restraining member and engageable with the nose ring of the animal, and a latch means for retaining the hook in engagement with the nose ring.

3. A restraining device comprising a head plate, means connecting the plate to an animal, a stem pivoted to said plate, a restraining member secured to said stem and to a nose ring of the animal, a washer element engaging the stem and mounted over the pivot of the stem, a spring seat on the stem, and a coil spring surrounding the stem and engaging the washer of the seat to yieldably support the stem at right angles to the plate.

4. A restraining device comprising a head plate, means connecting the plate to an animal, a stem pivoted to said plate, a restraining member pivoted to said stem and secured to a nose ring of the animal, a washer element engaging the stem, a spring seat on the stem, a coil spring surrounding the stem and engaging the washer and the seat to yieldably support the stem at right angles to the plate, and spring means for normally retaining the restraining member at right angles to the stem.

WILLIAM SMITH.